(12) United States Patent
Chen

(10) Patent No.: US 7,553,017 B1
(45) Date of Patent: Jun. 30, 2009

(54) EYEGLASSES TEMPLE AND MOULD FOR MAKING THE SAME

(76) Inventor: Pen-wei Chen, 14F-1, No. 30, Chung Cheng South Road, Yung Kang City, Tainan County (TW) 71067

( * ) Notice: Subject to any disclaimer, the term of this patent is extended or adjusted under 35 U.S.C. 154(b) by 0 days.

(21) Appl. No.: 12/328,685

(22) Filed: Dec. 4, 2008

(51) Int. Cl.
*G02C 5/18* (2006.01)

(52) U.S. Cl. .................. 351/117; 351/114; 351/122

(58) Field of Classification Search .......... 351/117, 351/114, 122, 123, 121, 111, 41, 158; 264/239, 264/250, 260
See application file for complete search history.

(56) References Cited

U.S. PATENT DOCUMENTS 4,563,066 A * 1/1986 Bononi ................. 351/122
4,639,104 A * 1/1987 Gaiser ................. 351/117
4,963,013 A * 10/1990 Bononi ................. 351/114

* cited by examiner

*Primary Examiner*—Hung X Dang
(74) *Attorney, Agent, or Firm*—Pro-Techtor Int'l. Services; Ralph Willgohs

(57) ABSTRACT

An eyeglasses temple and a mould for making the same, the eyeglasses temple comprises a connecting member having a butt-strap formed at the front end thereof, a metal rod and a flexible cover. A front end of the metal rod is fixed to a rear end of the connecting member. The flexible cover is formed by injection molding to wrap around the connecting member and an outer periphery of the metal rod. The metal rod is positioned in the center of the flexible cover. The flexible cover, the connecting member and the metal rod are fixed with one another stably, so that the quality of the eyeglasses temple is improved. Moreover, it is easy for the eyeglasses wearer to bend the metal rod and the flexible cover in order to adjust their bending angle for better wearing comfort.

4 Claims, 5 Drawing Sheets

EYEGLASSES TEMPLE AND MOULD FOR MAKING THE SAME

BACKGROUND OF THE INVENTION

1. Field of the Invention

The present invention relates to an eyeglasses temple and a mould for making the same, and more particularly to an eyeglasses temple and a mould for making the same, wherein the eyeglasses temple comprises a metal rod positioned in the center of a flexible cover.

2. Description of the Prior Art

A conventional eyeglasses temple 1, as shown in FIG. 1, has a butt-strap 11 formed at the front end thereof for pivotally connecting to an eyeglasses frame (not shown), and a hooking portion 12 formed at the rear end thereof for hooking to a wearer's ear. However, such an eyeglasses temple 1 is integrally formed, so that the bending angle of the hooking portion 12 is fixed and cannot be adjusted according to the size and the position of the wearer's ear, causing inconvenience in use.

Therefore, another conventional eyeglasses temple 2 appeared in the market, as shown in FIGS. 2 and 3, which comprises a connecting member 21 having a butt-strap 22 formed at the front end thereof for pivotally connecting to an eyeglasses frame (not shown), and a flexible metal rod 23 connected to the rear end thereof. A flexible cover 24 is formed by injection molding to wrap around the connecting member 21 and an outer periphery of the metal rod 23. The metal rod 23 can be bent together with the flexible cover 24 according to the size and the position of the wearer's ear. However, to wrap the connecting member 21 and the metal rod 23 with the flexible cover 24 by injection molding, the connecting member 21 and the metal rod 23 should be disposed between an upper mould 25 and a lower mould 26 first, so that the upper mould 25, the lower mould 26, the connecting member 21 and the metal rod 23 together will define a space S into which melted rubber will be injected. After the melted rubber injected into the space S is molded into the flexible cover 24, the upper mould 25 and the lower mould 26 can be removed. However, since the free end 231 of the metal rod 23 is not fixed, it will be deviated due to the pressure of the melted rubber, when the melted rubber is injected into the space S. After the flexible cover 24 is formed, the free end 231 will probably protrude out of the surface of the flexible cover 24, so that the resultant eyeglasses temple 2 will be defective.

Referring to FIG. 3, since the free end 231 of the metal rod 23 is disposed in the flexible cover 24 in a deviated manner, which makes it difficult for the eyeglasses wearer to bend the metal rod 23 and the flexible cover 24 in order to adjust their bending angle for better wearing comfort.

The present invention has arisen to mitigate and/or obviate the afore-described disadvantages.

SUMMARY OF THE INVENTION

The primary objective of the present invention is to provide an eyeglasses temple and a mould for making the same, the eyeglasses temple comprises a connecting member, a metal rod and a flexible cover.

The connecting member is provided with a butt-strap at a front end thereof.

A front end of the metal rod is fixed to a rear end of the connecting member, and a free end of the metal rod is defined with a through hole.

The flexible cover is formed by injection molding to wrap around the connecting member and an outer periphery of the metal rod. A rear end of the flexible cover is defined with two penetrating holes which are located at both ends of the through hole and are aligned with the through hole of the metal rod.

The mould for making the eyeglasses temple comprises an upper mould and a lower mould.

A positioning rod is upwardly protruded out of a bottom surface of the lower mould. The upper mould is abutted against the lower mould and the connecting member. The upper mould, the lower mould, the connecting member and the metal rod together define a space into which melted rubber will be injected by injection molding, and the melted rubber is molded into the flexible cover.

The metal rod is positioned in the center of the flexible cover, so that the quality of the eyeglasses temple can be improved, and it is easy for the eyeglasses wearer to bend the eyeglasses temple in order to adjust its bending angle for better wearing comfort.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
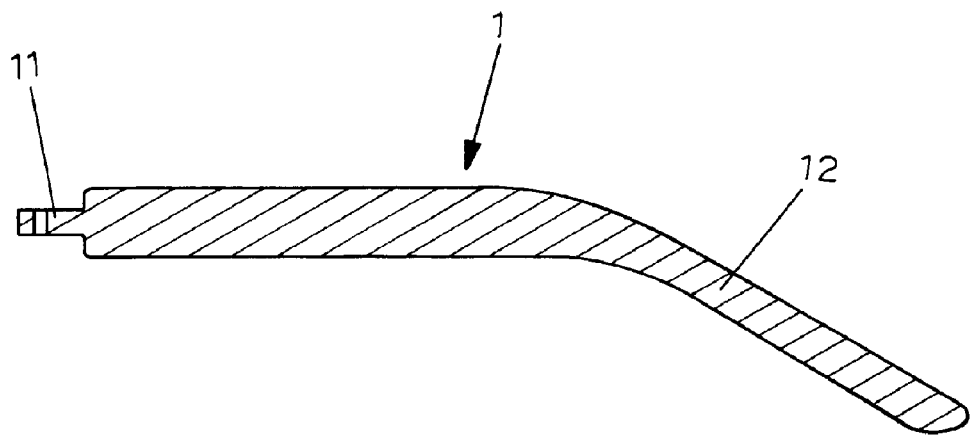
FIG. 1 is a cross sectional view of a conventional eyeglasses temple.
Figure 2:
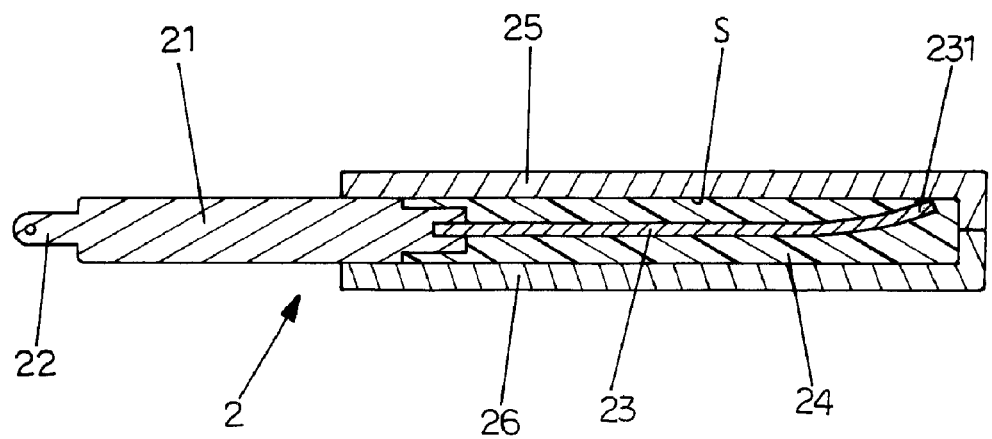
FIG. 2 is an assembly cross sectional view of another conventional eyeglasses temple and a mould for making the same.
Figure 3:
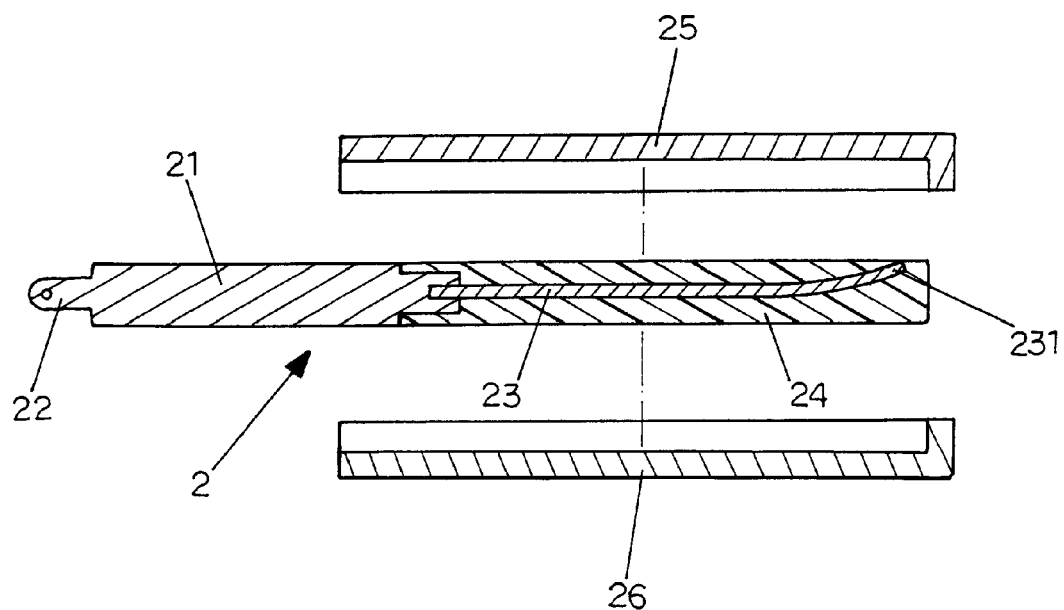
FIG. 3 is an exploded cross sectional view of the conventional eyeglasses temple and a mould for making the same.
Figure 4:
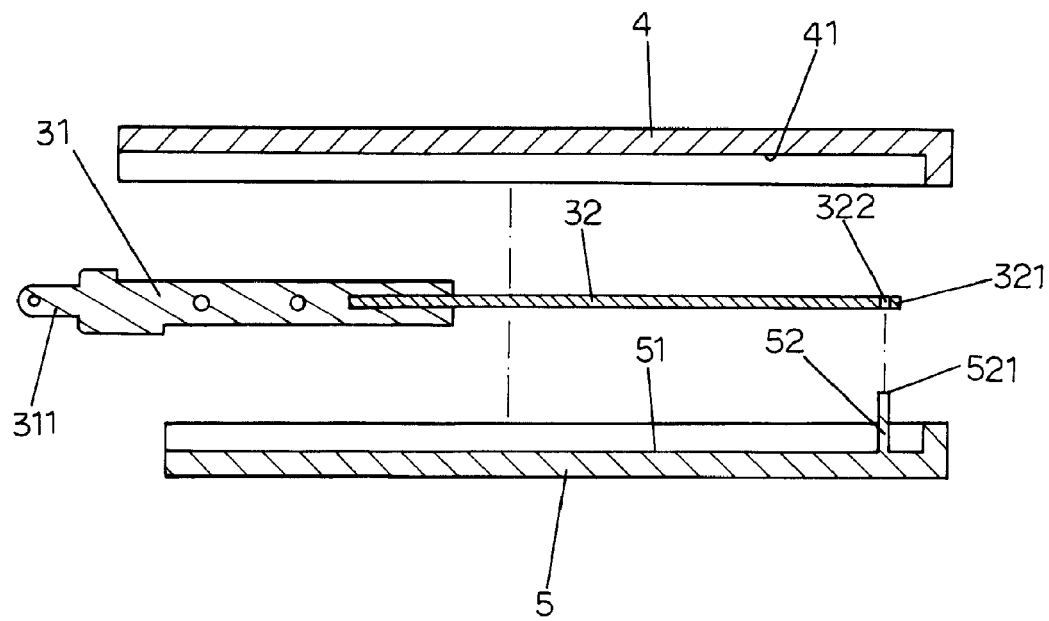
FIG. 4 is an exploded cross sectional view of an eyeglasses temple and a mould for making the same in accordance with the present invention.
Figure 7:
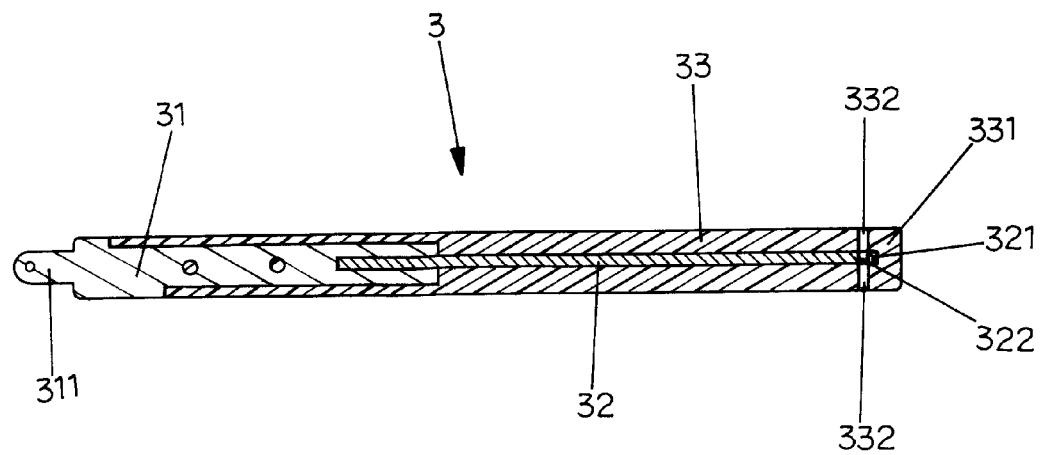
FIG. 7 is an assembly cross sectional view of the eyeglasses temple in accordance with the present invention.

Referring to FIGS. 4 and 7, an eyeglasses temple 3 in accordance with the present invention comprises a connecting member 31, a metal rod 32 and a flexible cover 33. A butt-strap 311 which is to be pivoted to an eyeglasses frame (not shown) is protruded out of a front end of the connecting member 31. The metal rod 32 is optimally made of copper material and flexible and is fixed to a rear end of the connecting member 31. A free end 321 of the metal rod 32 is defined with a through hole 322. The flexible cover 33 is made of rubber material and is formed by injection molding to wrap around the connecting member 31 and an outer periphery of the metal rod 32. A rear end 331 of the flexible cover 33 is defined with two penetrating holes 332 which are located at both ends of the through hole 322 and are aligned with the through hole 322.

A mould device of the present invention for forming the eyeglasses temple 3 comprises an upper mould 4 and a lower mould 5, and a positioning rod 52 is upwardly protruded out of a bottom surface 51 of the lower mould 5.

Figure 5:
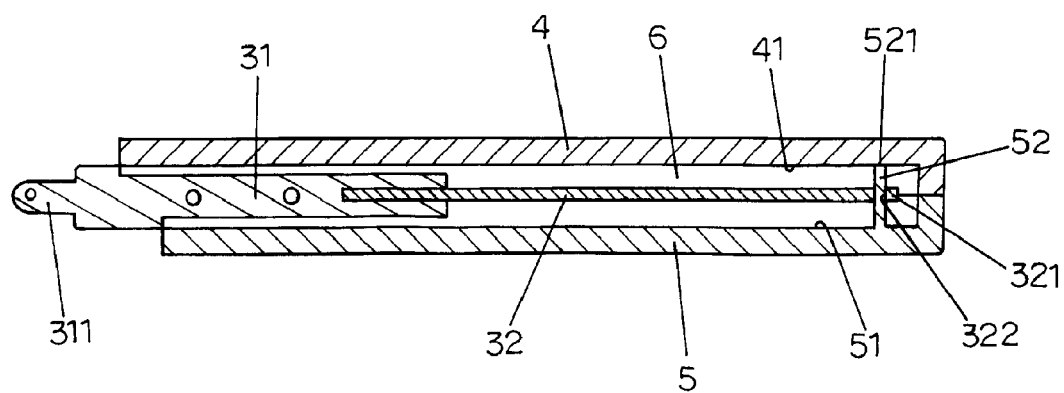
FIG. 5 is an assembly cross sectional view of the eyeglasses temple and a mould for making the same in accordance with the present invention (before injecting the melted rubber)
Figure 6:
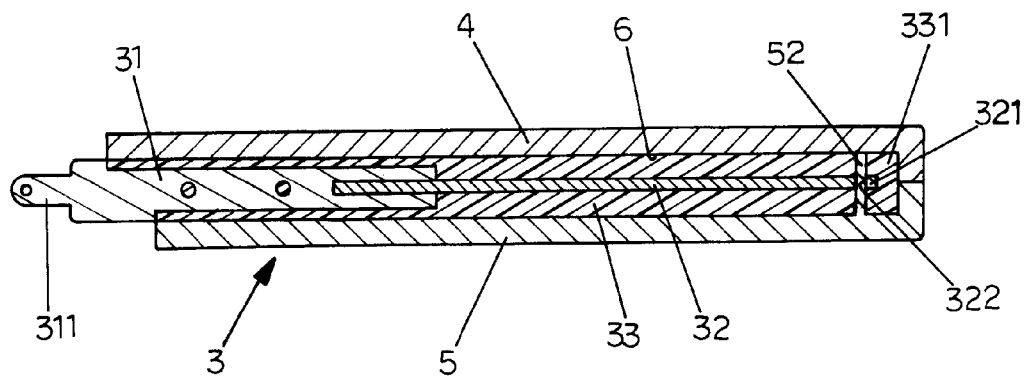
FIG. 6 is an assembly cross sectional view of the eyeglasses temple and a mould for making the same in accordance with the present invention (molding into the flexible cover after injecting the melted rubber)

Referring to FIGS. 5-7, to wrap the connecting member 31 and the metal rod 32 with the flexible cover 33 by injection molding, the connecting member 31 and the metal rod 32 should be disposed in the lower mould 5 first in such a manner that the positioning rod 52 is inserted through the through hole 322 of the metal rod 32, the upper mould 4 is abutted against the lower mould 5 and the connecting member 31, and a top end 521 of the positioning rod 52 is abutted against a top surface 41 of the upper mould 4, so as to position the metal rod 32. Meanwhile, the connecting member 31, the metal rod 32, the upper mould 4 and the lower mould 5 together will define a space 6 into which melted rubber will be injected, and the metal rod 32 is positioned in the center of the space 6. After the melted rubber injected into the space 6 is cooled down and molded into the flexible cover 33, the upper mould 4 and the lower mould 5 can be removed. The penetrating holes 332 are formed in the flexible cover 33 by the removal of the positioning rod 52 and aligned to the through hole 322 of the metal rod 32.

Figure 8:
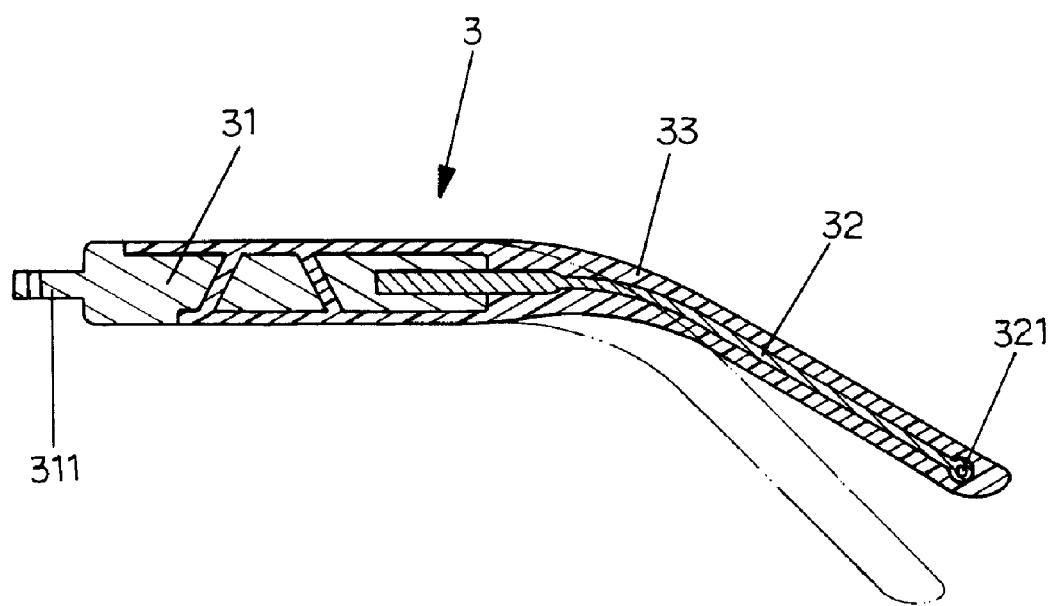
FIG. 8 is an illustrative view showing a bending angle of the eyeglasses temple in accordance with the present invention.

Referring to FIG. 8, when in use, the metal rod 32 is flexible, and the flexible cover 33 made of rubber material is elastic and anti-slip, so that the metal rod 32 of the eyeglasses temple 3 can be bent together with the flexible cover 33 according to the size and the position of the wearer's ear. Thereby, such an eyeglasses temple 3 is convenient to use.

As compared with the conventional eyeglasses temple, the present invention has the advantages described as follows:

Firstly, the free end 321 of the metal rod 32 is fixed by the positioning rod 52 of the lower mould 5, so that when the melted rubber is injected into the space 6, the metal rod 32 can be prevented from deviating from the correct position in such a manner that the metal rod 32 is positioned in the center of the flexible cover 33, thus ensuring the quality of the eyeglasses temple 3.

Secondly, since the metal rod 32 is positioned in the center of the flexible cover 33, which makes it easy for the eyeglasses wearer to bend the metal rod 32 and the flexible cover 33 with less force, in order words, the bending angle of the rod 32 and the flexible cover 33 is easily adjustable for better wearing comfort.

While we have shown and described various embodiments in accordance with the present invention, it should be clear to those skilled in the art that further embodiments may be made without departing from the scope of the present invention.

What is claimed is:

1. An eyeglasses temple comprising:
   a connecting member being provided with a butt-strap at a front end thereof;
   a flexible metal rod, a front end of which being fixed to a rear end of the connecting member, a free end of which being defined with a through hole; and
   a flexible cover being formed by injection molding to wrap around the connecting member and an outer periphery of the metal rod, a rear end of the flexible cover being defined with two penetrating holes located at both ends of the through hole and aligned with the through hole of the metal rod.

2. The eyeglasses temple as claimed in claim 1, wherein the metal rod is made of copper material.

3. The eyeglasses temple as claimed in claim 1, wherein the flexible cover is made of rubber material.

4. A mould for making the eyeglasses temple as claimed in claim 1 comprising:
   an upper mould; and
   a lower mould, a positioning rod being upwardly protruded out of a bottom surface of the lower mould, the upper mould being abutted against the lower mould and the connecting member, the upper mould, the lower mould, the connecting member and the metal rod together defining a space into which melted rubber being injected, the melted rubber being molded into the flexible cover.

* * * * *